Jan. 26, 1954  R. C. HERGENROTHER  2,667,635
MOVING TARGET INDICATOR RADAR SYSTEM
Filed Sept. 20, 1947  3 Sheets-Sheet 2

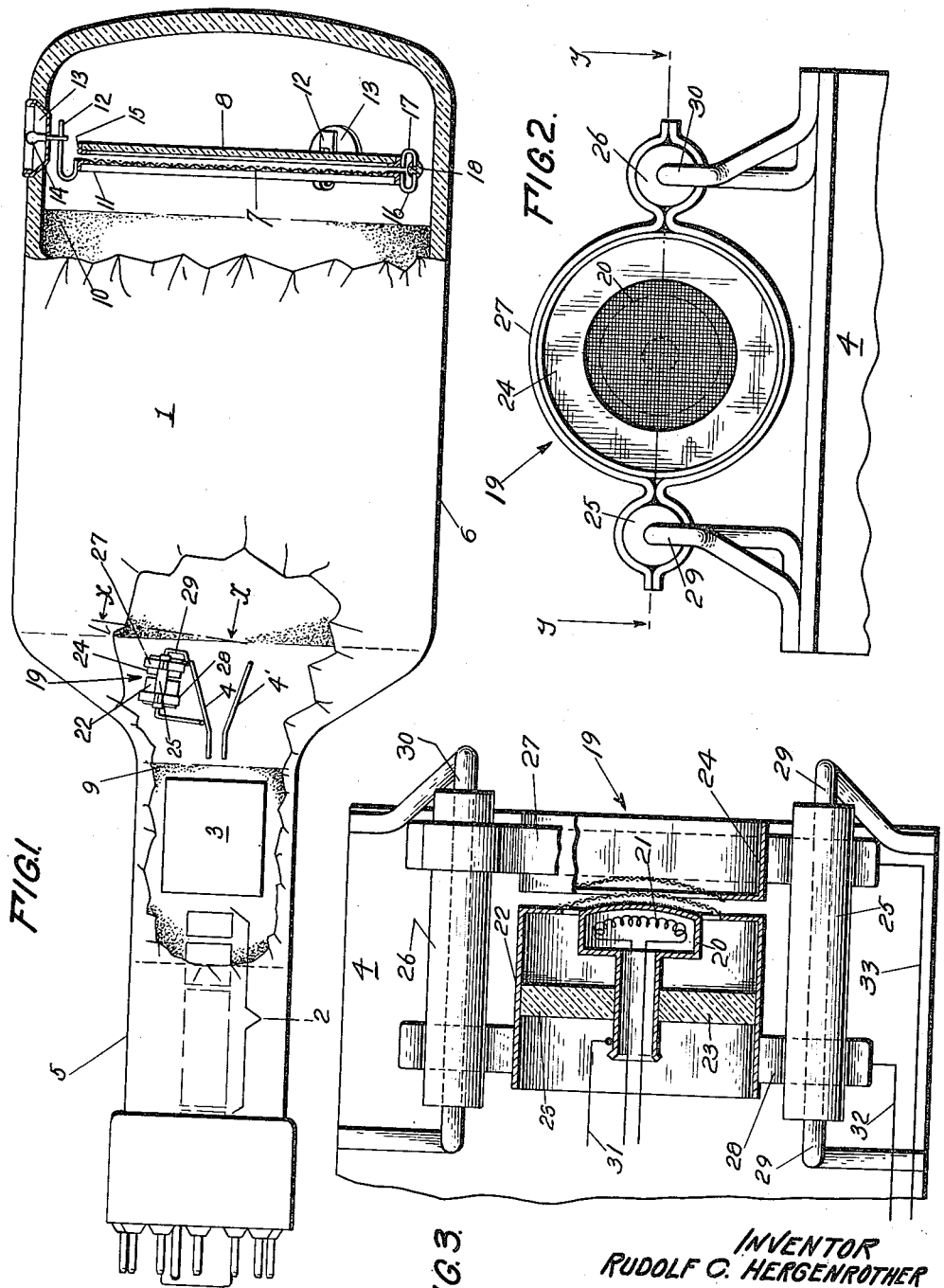

INVENTOR
RUDOLF C. HERGENROTHER
BY
ATTY.

Jan. 26, 1954  R. C. HERGENROTHER  2,667,635
MOVING TARGET INDICATOR RADAR SYSTEM
Filed Sept. 20, 1947  3 Sheets-Sheet 3

INVENTOR
RUDOLF C. HERGENROTHER
BY [signature]
ATTY.

Patented Jan. 26, 1954

2,667,635

UNITED STATES PATENT OFFICE 2,667,635

MOVING TARGET INDICATOR RADAR SYSTEM

Rudolf C. Hergenrother, West Newton, Mass., assignor to Raytheon Manufacturing Company, Newton, Mass., a corporation of Delaware Application September 20, 1947, Serial No. 775,291

5 Claims. (Cl. 343—7.7)

This invention relates to electron discharge devices, and more particularly to the type thereof known as storage tubes, in which an electron beam is used to place a charge on a non-conducting electrode disposed therein.

In a storage tube of the aforesaid type which is adapted to be used in a radar system, a signal such as a radar echo is stored in the form of an electrical charge distribution on the surface of the non-conducting electrode or storage plate. In moving target indicator (MTI) applications, an individual complete trace over the storage surface (one recording) is needed only for comparison with the next succeeding trace, and thereafter, its presence becomes more and more objectionable, since successive radar echoes will have a continually changing character for fixed targets, as well as moving targets, when the search antenna is rotated. This requires that an individual "recording" should persist over a period of several transmitted pulses but should rapidly fade out thereafter.

In electronic computer applications, the storage tube is used to record information which has been translated into a pattern of charges on the storage surface. This information can be "played back" at the time and in the manner desired. It is desirable to be able to hold the information for any desired length of time, to be played back any desired number of times until the operation is completed. After the information has been used, the tube must be made available for a new recording, which means fading out of the storage plate charge.

It is, therefore, an object of the present invention to devise a means for controlled rapid fading or "charge erasure" of the storage surface charge or recording of a storage tube.

Another object is to devise a means for controllably biasing the storage surface of a storage tube to a potential level which is substantially different from that placed on it by the "recording beam".

The foregoing and other objects of the invention will be best understood from the following description of some exemplifications thereof, reference being had to the accompanying drawings, wherein:

Fig. 1 is an elevation, partially broken away, of a storage tube according to the present invention;

Fig. 2 is an elevation, on an enlarged scale, of the electron flood gun structure of the present invention, this view being taken in the direction $x$—$x$ of Fig. 1;

Fig. 3 is a part plan, part sectional, view of the flood gun structure, taken along the line $y$—$y$ of Fig. 2;

Figure 4:
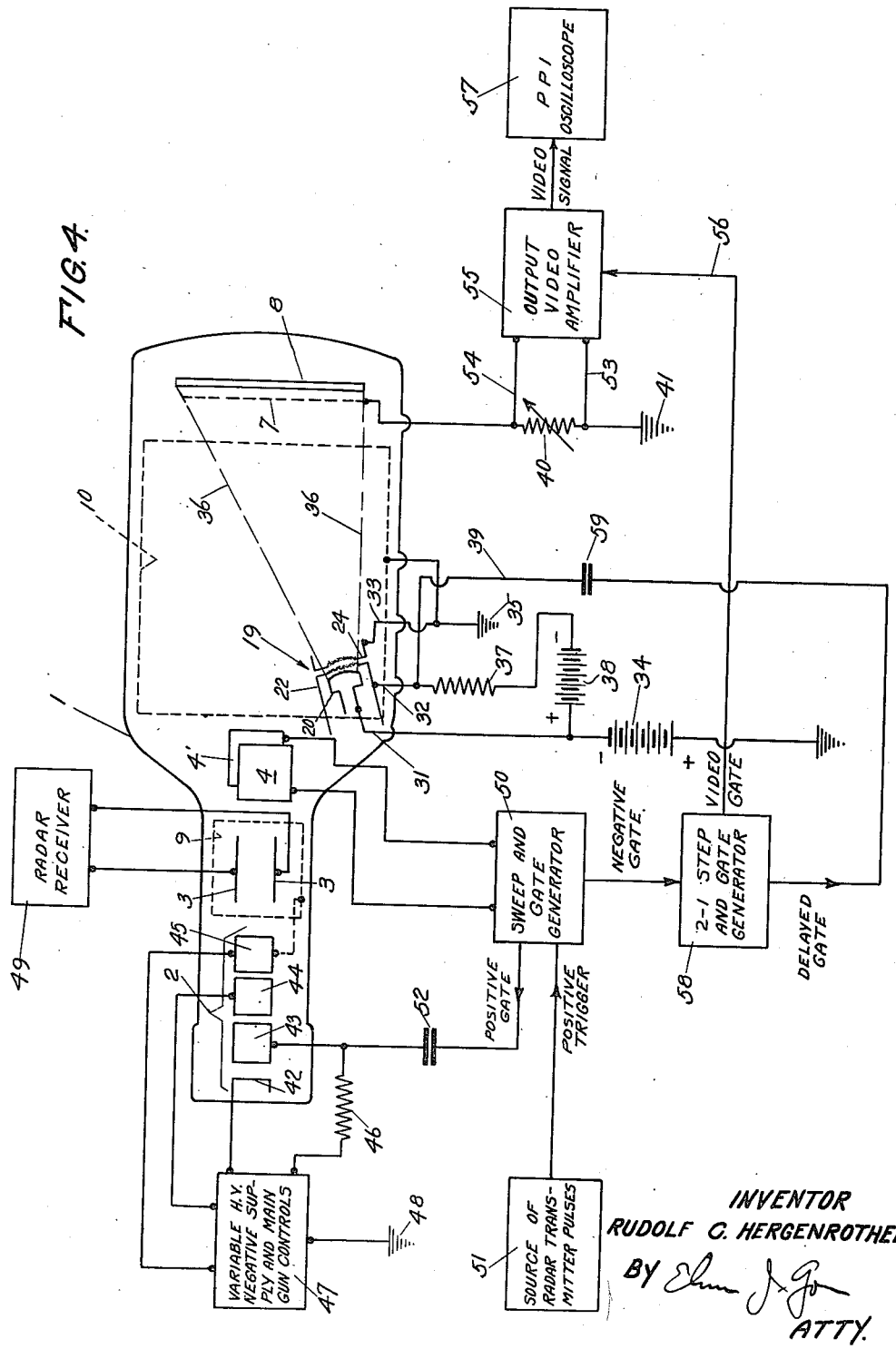
Fig. 4 is a diagrammatic representation of a system including a storage tube of the present invention.

Now referring to the drawings, with particular reference to Figs. 1–3 thereof, the numeral 1 indicates an evacuated vessel of the type usually associated with electron beam projection type electron discharge devices. Within said vessel there is disposed a main electron gun 2 (shown in outline), a pair of vertically-disposed deflecting plates 3 and a pair of horizontally-disposed deflecting plates 4 and 4'. The electron gun 2 is located within the narrow portion or neck 5 of the vessel 1, the method of projection of the electron beam therefrom being quite familiar to those skilled in the art of cathode-ray oscilloscopy.

Disposed within said vessel in the larger portion 6 thereof is a pair of electrodes 7 and 8. An electrically-conductive coating 9 covers the upper portion of neck 5, while another similar coating 10 covers well over half the length of the larger portion 6. Coatings 9 and 10 are suitably connected to part of the electron gun structure 2 in a manner well known to those skilled in this particular art and serve to electrically shield the electron beam emanating from the gun 2. The electrode 7, which is preferably constructed of 1 mil tungsten wire in the form of a 100 mesh screen, is disposed perpendicularly to the electron beam, said electron beam passing through said screen electrode 7 and impinging on the electrode 8. This latter electrode is composed of a non-conductive material such as glass. The electron beam upon striking the electrode 8 places a charge on said electrode.

The electrode 7 is suitably fastened to an electrically-conductive annular member 11 and said annular member is in turn supported within the envelope 1 by means of a plurality of angularly-spaced stiff current-carrying conductors 12 which are welded or brazed to annular member 11 and also welded or brazed to corresponding cup-shaped metallic members 13 which are fused through the wall of envelope 1 and which have integral therewith metallic ball cap terminals 14.

Electrode 8, which acts as a potential storing surface and whose plane is perpendicular to the path of the main electron beam, is suitably fastened in and supported by a second annular member 15.

In order to support member 15, and in order to maintain electrodes 7 and 8 a predetermined distance apart, said distance being of the order of the narrowest dimension of the main electron beam, for example, a pair of supporting members 16 and 17 respectively attached, as by welding or other suitable means, to the annular members 11 and 15, the other ends of said supporting members being embedded in an electrically insulating bead 18 which may be composed of glass or other insulating material. Preferably, a plurality of supporting means similar to means 16—18 are utilized, these means being spaced angularly around members 11 and 15.

A second electron gun or flood gun structure, generally designated by numeral 19, is supported by the horizontally-extending deflecting plate 4, inside envelope 1. Figs. 2 and 3 show, in a detailed manner, the construction and mounting of structure 19. An electron-emissive cathode 20, consisting of a hollow substantially cylindrical metallic member, one end of which has a coating of emissive material thereon and which has a suitable heater 21 therein, is mounted axially of a tubular metallic control grid member 22 by means of a ceramic washer 23. The end of flood gun control grid 22 adjacent the emissive surface of the cathode has an electron aperture therethrough, a suitable fine wire screen being attached to said grid and covering said aperture. The grid screen is spaced from cathode 20.

A metallic tubular anode member 24 is mounted adjacent but spaced from grid member 22, on the opposite side of said grid from cathode 20. The end of anode 24 adjacent grid 22 has an electron aperture therethrough, a suitable fine wire screen being attached to said anode and covering said aperture; the opposite end of anode 24 is open.

Cathode 20, grid 22, and anode 24 are all coaxial, and the size of the electron apertures and the spacing of these electrodes are made such that, when the electrodes are energized by the proper potentials, a rather broad beam of electrons will emanate or be shot from the open end of anode 24.

In order to support and properly insulate the flood gun structure 19 from deflecting plate 4, a pair of diametrically-opposed elongated ceramic tubes 25 and 26 is provided, the longitudinal axes of these tubes being arranged parallel to the common axis of electrodes 20, 22, and 24. A metallic collar 27 tightly surrounds anode 24 and has a pair of integral diametrically-opposite outwardly-extending sleeve ears which surround and tightly engage the corresponding insulating tubes 25 and 26 to support said anode in position. A similar metallic collar 28 tightly surrounds grid 22 and has a similar pair of integral diametrically-opposite outwardly-extending sleeve ears which surround and tightly engage the corresponding insulating tubes 25 and 26 to support said grid and the cathode in position. In order to insulatingly support the entire structure 19 from plate 4 through insulating tubes 25 and 26, a stiff wire 29 passes longitudinally through the center of tube 25 and a stiff wire 30 passes longitudinally through the center of tube 26; these wires firmly engage the material of the corresponding tubes at the peripheries of such wires. The opposite ends of wire 29 are bent downwardly and outwardly toward the adjacent side edge of plate 4 and are welded to the upper surface of said plate adjacent such edge; the opposite ends of wire 30 are similarly bent downwardly and outwardly toward the adjacent (other) side edge of plate 4 and are welded to the upper surface of said plate adjacent such edge. In this way, the entire flood gun structure 19 is supported by deflecting plate 4.

The structure 19 is mounted so that the axis of electrodes 20, 22, and 24 points approximately at the center of electrodes 7 and 8. As stated above, the electron flood gun 19 is designed to produce a rather broad beam of electrons, and the area of this beam is made such that it will cover the entire area of potential storing surface 8, so that the gun 19 floods the entire storage surface with an electron beam when said gun is energized or turned on.

In order to provide electrical connection to flood gun 19, the opposite ends of the heater 21 are brought out through the lower end of cathode 20, a lead 31 is welded to the outer surface of cathode 20 and is brought out through the lower open end of grid 22, a lead 32 is welded to the sleeve portion of the ear of grid collar 28, and a lead 33 is welded to the sleeve portion of the ear of anode collar 27.

The secondary emission ratio of an electron target, whether an insulator or a conductor, depends on the voltage of the incident electrons. The secondary emission ratio of such a target may be defined as the ratio of the secondary emission current leaving the target to the primary electron current striking the target, and for each material there is a certain value $V_1$ of primary electron voltage which gives for such material a secondary emission ratio of unity. When the voltage of the primary electron beam is less than the value $V_1$, the number of electrons striking the target exceeds the number leaving the target. It has been found that, if the target is an insulator bombarded with an electron beam having a voltage less than $V_1$, a negative charge is accumulated thereon, this accumulation continuing until the potential of the insulator surface reaches the potential of the bombarding electron gun cathode. At this surface potential, the bombarding beam is turned back at the surface and a condition of equilibrium is reached. This effect provides a means of charging an insulating surface (storage surface) to any desired potential equal to or less than the equilibruim potential, at any desired time, and at any desired speed, and can, therefore, be used to storage surface charge erasure.

Fig. 4 represents the use of the storage tube of this invention in connection with the visual reproduction of a signal due to the presence of a moving target in a given area scanned by a pulse-echo object-detecting or radar system. In other words, this figure represents the use of a storage tube of this invention in a so-called MTI system. For convenience in illustration, the tube is rotated through 90° from its position in Fig. 1, so that deflecting plates 3 are now horizontally-disposed and deflecting plates 4 and 4' are now vertically-disposed. The flood gun structure 19 is represented as being spaced from deflecting plate 4; however, it is to be understood that the showing in Fig. 4 is merely diagrammatic and that such structure is actually supported by deflecting plate 4, as described above in connection with Figs. 1–3.

Cathode 20 of flood gun 19 is connected to the negative end of a suitable source 34 of direct voltage, for example, a battery, the positive end of which is connected to ground, so that the flood gun cathode has a negative potential with respect to ground. The voltage of the battery 34 is $V_f$, and is less than the voltage $V_1$ defined above. The flood gun anode 24 is connected to ground, as at 35, so that, when the flood gun is turned on, the entire storage surface 8 will be flooded with an electron beam, the outer limits of which are indicated at 36, whose voltage is less than $V_1$. Coating 10 is also connected to ground 35, as shown. The flood gun control grid 22 is connected through a resistor 37 to the negative terminal of a biasing battery 38, the positive terminal of which is connected to cathode 20. The voltage of battery 38 is such that grid 22 is normally biased to cutoff, so that beam 36 is normally off but may be flashed on by applying an impulse of the proper amplitude and polarity to grid 22 by means of a lead 39 connected to said grid.

The potential of the collecting screen 7 relative to the potential of flood gun cathode 20 will determine the speed of the flood beam electrons striking the storage surface 8. Screen 7 is connected through a variable resistor 40 to ground at 41, so that said screen is at ground potential. The potential of said screen relative to cathode 20 is the voltage $V_f$ of battery 34, because one end of said battery is grounded and the opposite end thereof is connected to cathode 20. $V_f$ as stated above, is less than the critical voltage $V_1$ corresponding to a secondary emission ratio of unity for the material 8. Under these conditions, the number of flood beam electrons striking the target 8 exceeds the number of secondary electrons leaving said target. A negative charge is therefore accumulated on surface 8, this accumulation continuing until the potential of the insulator surface 8 reaches the potential of the bombarding electron gun cathode, or a potential of minus $V_f$ relative to ground or the screen 7; at this surface potential, the bombarding electron flood beam is turned back or repelled just at the surface of plate 8, due to the negative potential thereof, and a condition of equilibrium is reached.

The beam current required to erase the storage surface charge, or to bring the entire surface to a common potential, depends on the length of the flood gun beam pulse, the voltage $V_f$, and the capacitance between the storage surface 8 and the collecting screen 7. As a typical example, for a flood gun voltage $V_f$ of 50 volts, a flood beam duration of 3 microseconds, and a storage plate of 10 centimeters by 10 centimeters by 0.1 centimeter having a dielectric constant of 6, the required flood gun current is 9 milliampers.

The main electron gun 2 comprises a suitably heated cathode 42 that acts as a source of electrons, a control grid 43 that limits the number of electrons travelling toward plate 8, a first or focusing anode 44, and a second or accelerating anode 45.

A suitable variable high-voltage negative supply 47 provides the necessary bias on control grid 43, said control grid being connected to said supply through a resistor 46. This same source of supply 47 includes main gun controls, and is also connected to cathode 42, anode 44, and anode 45, to provide the necessary high voltages to these electrodes, in a manner familiar to those skilled in the art pertaining to this type of electron discharge device. Coating 9 may be connected to the second anode 45 as shown, said anode ordinarily being grounded as by connection 48. In this manner, a high-voltage main electron beam is produced by gun 2.

Deflecting plates 3 are arranged to deflect the main electron beam from gun 2 in a vertical direction, and these plates are connected to receive the output from a radar receiver 49, which is shown in block form because such a receiver is conventional and is familiar to those skilled in the radar art. The output of receiver 49 is a series of pulses corresponding to those reflected from reflecting objects in space within the field of search of the radar equipment, so that said receiver may be termed a means for detecting secondary echo pulses occurring between successive primary or transmittted pulses of electromagnetic energy. The main electron beam is deflected in accordance with the secondary echo pulses, by the above-described connections.

Deflecting plates 4 and 4' are arranged to deflect the main electron beam horizontally, and said plates are connected to receive a sweep voltage from sweep generator 50, which is in turn connected to the source 51 of radar transmitter pulses in such a way as to be triggered by a positive triggering pulse supplied by source 51 to sweep generator 50 at the time of each transmitted pulse. In response to this positive triggering pulse, sweep generator 50 provides a nearly linear rising voltage which is applied to deflecting plates 4 and 4' to produce a deflection of the main electron beam to the right.

Sweep and gate generator 50 also generates, in response to the positive trigger from source 51, a positive gate pulse which is applied to the main gun control grid 43, through a condenser 52, as an intensifying pulse. Sweep and gate generator 50 is shown in block form since it is conventional and is familiar to those skilled in the pulse-echo radar art.

The above-recited connections to the main electron gun 2 and to the two pairs of deflecting plates are like those utilized in a so-called type A radar indicator, in which the echo pulses cause upward deflections to occur along the sweep trace on storage surface 8 at distances from the transmitted pulse deflection proportional to the range of the target, the height of such deflections corresponding to the received signal intensity.

Figure 5:
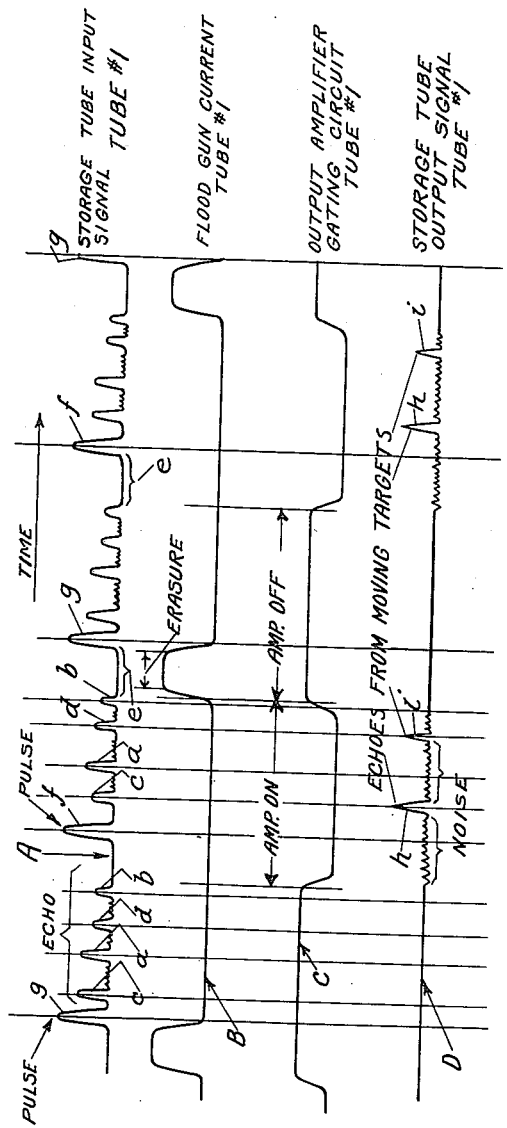
Fig. 5 is a series of wave forms illustrating the operation of the system of Fig. 4.

This type of indication is represented by the wave A in Fig. 5, which wave is labelled "Storage Tube Input Signal." Wave A represents four successive sweep traces occurring over storage surface 8, these traces being placed end-to-end in Fig. 5. The "pips" $g$ and $f$ marked "pulse" represent the primary or transmitted pulses, while those marked "echo" indicate the echo or secondary pulses. The pips $a$ and $b$ represent echoes from stationary targets, while pips $c$ and $d$ represent echoes from moving targets.

Assume that the flood gun 19 has brought the potential of plate 8 to a small negative value, $V_f$, with respect to ground, as described above. The bringing of surface 8 to this potential occurs as a result of bombarding the surface 8 with the flood gun electron beam 36, as described above.

As previously described, the main electron beam is swept across the storage surface 8 in a repeated trace pattern and the radar receiver signal is applied in such a manner as to deflect the beam in a direction perpendicular to the direction of sweep.

The main electron beam is of high voltage, on the order of 1500 volts, for example. This voltags is substantially greater than the so-called critical voltage $V_1$ defined above, which critical voltage gives a secondary emission ratio of unity for target 8. Therefore, the number of secondary electrons leaving the target 8, from the areas bombarded by the main electron beam of gun 2, is in excess of the number of primary electrons striking said target in such areas. Since the voltage of the main electron beam is substantially greater with respect to ground than is the potential of surface 8 produced by the bombardment of said surface by flood beam 36, the electrons of the main beam will reach said surface with a high velocity, being retarded only by the small negative potential, on the order of 50 volts, for example, between screen 7 or ground and plate 8. In the example given, the retardation being only 50 volts, the electrons of the main beam will strike plate 8 with a velocity corresponding to a voltage of 1450 volts, this slightly smaller voltage still being greater than the critical voltage $V_1$. Therefore, and since there are more secondary electrons leaving the target 8 than there are primary electrons striking said target, a net positive charge or voltage tends to be produced on plate 8 in the areas bombarded by the main electron beam from gun 2.

The main electron beam current is made sufficiently high, with a given sweep or writing speed, to produce an equilibrium potential, or an equilibrium condition of zero current, throughout the areas bombarded by the main electron beam. This equilibrium condition results from the following action. As the surface or plate 8 builds up a positive potential, due to the secondary emission ratio being greater than unity, as described above, the positive charge on this plate tends to attract the secondary electrons produced back to the plate, since such electrons have a rather slow velocity. The positive potential of surface 8 also tends to increase the velocity of the primary electrons striking said surface, to thereby produce more secondary electrons, but this effect is greatly overshadowed by the attracting or retarding effect of the positively-charged plate on the secondary electrons, since the primary electrons are of very high velocity as compared to the velocity of the secondary electrons, and it therefore requires a much greater voltage change to produce an appreciable effect on the primary electrons than on the secondary electrons. This retarding or attracting effect on the secondary electrons increases as the voltage of plate 8 becomes more positive, until a point is reached at which the number of secondary electrons which succeed in escaping the retarding or attracting voltage of plate 8, and which therefore leave said plate, equals the number of primary electrons striking the plate, giving a zero net current at this equilibrium point.

Continuing with the specific example given above, it has been found that this equilibrium condition is reached when the potential of plate 8 is on the order of 2 volts positive with respect to screen 7 or ground. Therefore, since this equilibrium condition is reached in a single trace or sweep of the main electron beam across surface 8, a completed trace will leave the storage surface 8 covered with a line of discrete charges at equilibrium potential, or having a predetermined value of potential with respect to ground, on the order of 2 volts positive, for example. In other words, the beam trace will produce a line on surface 8 along which the potential is uniform and predetermined, said potential being substantially different from the potential of those areas not bombarded by the main electron beam because the areas not so bombarded remain at the negative 50 volts potential (with respect to ground) to which they have been brought by the flood gun beam 36.

The collector screen 7 is connected to ground through a resistor 40, as described above. Leads 53 and 54 are connected to opposite ends of said resistor and to the input of an output video amplifier 55, so that the voltage across said resistor is used as the input signal to said amplifier. The amplifier 55 is capable of being gated on and off through a connection 56, and the signal output of said amplifier is applied to a plan position indicator (P. P. I.) oscilloscope 57. By these connections the collecting screen 7 is capable of being utilized as a signal plate.

A completed beam trace produces a line on surface 8 of uniform predetermined potential. A succeeding trace which exactly duplicates the first trace produces no output across resistor 40 during said second trace, since the beam finds an equilibrium condition at each point in its trace. Any deviation in the second trace from the path covered in the first trace will result in a change of potential of the storage surface, in such areas, from the bias potential to the equilibrium potential in the manner described above, thus producing for such deviation areas an output voltage across resistor 40, since, in such a deviation, the beam will encounter areas on the surface 8 which are still at the negative biasing potential and are not at the small positive predetermined equilibrium potential. For such deviation areas, there will be a net electron current, producing a voltage change across resistor 40. The voltage changes on surface 8 are capacitively coupled to screen 7 because of the capacitance between these two elements.

In radar systems, so-called "ground clutter" repeats the same pattern in successive radar echoes, while echoes from moving targets fluctuate in intensity and/or in time relation to the transmitted pulses in successive radar echoes. If only ground clutter is being received, successive beam traces will have exactly the same pattern, and no output will be produced. However, if moving targets are present in the field being scanned, successive beam traces will deviate from each other, and output signals will be produced on oscilloscope 57 indicative of such deviations. Therefore, the storage tube operates very effectively as a moving target indicator.

Sweep and gate generator 50 supplies, in addition to the positive gate impulses to control grid 43 and the sweep voltage to deflecting plates 4 and 4', a negative gate impulse to the two-to-one step and gate generator circuit 58 for each transmitted pulse it in turn receives from source 51. The circuit 58 splits the input thereto, producing a single output pulse for every two input pulses; the circuit 58 also includes a delay device such as a multivibrator, so that a delayed positive gate pulse is produced by said circuit and transmitted through condenser 59 to lead 39 and control grid 22 of flood gun 19, once for every two transmitted radar pulses.

The circuit 58 also produces a video gating impulse which is applied to video amplifier 55 and is used to gate said amplifier on. Normally said amplifier is biased beyond cutoff, so that no signals can be transmitted therethrough, but is capable of being gated on by a suitable gating pulse applied from circuit 58 through connection 56. Each video gating impulse has a pulse length which is substantially equal to the time interval between successive transmitted pulses of source 51, and one of these pulses for gating amplifier 55 on is supplied by the two-to-one circuit 58 for every two transmitted radar pulses. The gating pulses for the flood gun grid 22 and for the amplifier 55 are therefore supplied for every alternate pulse from source 51, and the circuits are so arranged that an amplifier gating pulse is initiated half way between successive flood gun grid gating pulses.

It has been explained above that the flood beam 36 provided by flood gun 19 will, when turned on, provided the voltage of battery 34 has the proper value, charge the entire area of the storage surface 8 to the voltage of battery 34 relative to ground or to collecting screen 7. As explained previously, the grid 22 is normally biased to cutoff, so that beam 36 is normally off. The delayed positive gate pulse supplied to grid 22 from circuit 58 causes the flood electron beam 36 to be flashed on for a length of time equal to the length of said positive gate pulse. Therefore, the entire area of surface 8 is brought to a common predetermined (by the voltage of battery 34) negative potential by the flashing on of flood beam 36, and this potential is substantially different from that placed on said surface by the beam traced out thereon by the main electron gun 2, as described above.

The above discussion, in explaining how the "record" is placed on storage surface 8, started with the assumption that the flood gun beam 36 had brought the potential of plate 8 to a negative potential $V_f$ with respect to ground. The "record" made by the main electron beam has now brought the areas of plate 8 which were bombarded by the main electron beam to a small positive potential with respect to ground. These bombarded or "record" areas, having a positive potential with respect to ground, will tend to retard or attract the secondary electrons produced by the bombardment of plate 8 by flood beam 36. Since the voltage $V_f$ is lower than the critical voltage $V_1$, and since the number of secondary electrons tends to be reduced by the aforesaid retardation or attraction, the number of primary electrons striking surface 8 exceeds the number of secondary electrons leaving said surface, accumulating a negative charge thereon. Since the entire area of surface 8 is brought to a common potential $V_f$ with respect to ground in this manner, the "record" areas are brought to this potential $V_f$ as above described. Therefore, when flood beam 36 is flashed on, any line of uniform potential, or any line of charges, which has been placed on surface 8 by the main electron beam, is effectively removed or "erased" from said surface, so that the same is made ready for a new "recording."

After the "recording" has been erased, a new one is placed on surface 8 by the next successive beam trace of the main electron beam from gun 2. As the main electron beam sweeps out a pattern on surface 8, each and every point touched by this beam is brought from a negative potential $V_f$ (previously placed thereon by flood beam 36) to a rather small positive potential in the manner described above. Thus, a fairly large change of potential, on the order of 52 volts for example, is produced at each and every point along this beam trace pattern. The next succeeding main beam trace, caused to occur by means of the next succeeding transmitted pulse from source 51, is compared with the first trace as above described. A succeeding trace which exactly duplicates the first trace produces no output across resistor 40 since the beam encounters no change of potential at any point in this trace. However, any deviation in the second trace from the path covered in the first trace will cause the beam to encounter an area on surface 8 which is still at the negative potential to which it has previously been biased by flood gun 19. Such deviation areas will be brought by the main beam from the negative biasing potential to the rather small positive equilibrium potential, in the same manner as previously described for the first trace, giving a large voltage change in the output resistor 40 and a consequent large output signal on scope 57. The deviation areas will not be at the uniform predetermined equilibrium potential value to which the points covered by the first trace have been brought.

It is desired to be brought out, at this juncture, that by the provision of flood gun 19 I have devised a means for controlled rapid fading or "charge erasure" of the storage surface charge of the storage tube at any desired time.

Since the flood gun is flashed on once for every two transmitted pulses, the surface charge on storage surface 8 is removed after each two successive beam traces have been compared, and the process is repeated. This will appear more clearly hereinafter from a consideration of Fig. 5.

The collector screen 7 receives a current surge during the electron flood beam operation, during which operation every point on surface 8 is brought to a fairly high negative potential. For protection of the amplifier 55 from this surge, and also in order to prevent any false indications on scope 57, the amplifier 55 is gated off during erasure, as will appear subsequently.

During the first trace after each erasure, every point on the trace is brought from the biasing potential to a small predetermined potential, as stated above, thus producing during this time potential changes which are not indicative of moving targets. In order to prevent false indications from being produced on scope 57 by these potential changes, the amplifier is also gated off during this first trace, as will appear hereinafter. During the second or comparison trace, the amplifier 55 is gated on to produce indications of moving targets, if any are present, on scope 57.

Now referring to Fig. 5, the four wave forms represent a typical sequence of operations of the system of Fig. 4. Curve A has already been referred to; this curve represents four successive sweep traces or echo patterns occurring over storage surface 8. The pips $a$ and $b$ represent echoes from stationary targets; it will be seen that these pips remain constant in amplitude and in time spacing with respect to the transmitted pulses throughout the time of these four patterns. Pips $c$ and $d$ represent echoes from moving targets. These pips are shown as varying both in time spacing with respect to the transmitted pulses and also in amplitude from one sweep trace to the next succeeding sweep trace. In most practical systems the time spacing variation is quite small while the amplitude variation is quite large. In any event the change at any one spot on the storage surface 8 is manifested as a variation in the value or amplitude of the potential at that spot. Thus it may be most convenient to consider the variations which the moving targets introduce on the storage surface as amplitude variations. After the last echo $b$ has been received, there is a "quiet time" interval $e$ from the cessation of this echo until the next transmitted pulse; during this time no echoes are received because the objects from which echoes could be received are beyond the range of the transmitted signals.

Curve B represents the flood gun current. As explained above, erasure of the charge on storage surface 8, or the biasing of the entire surface to a common rather large negative potential, occurs during the time that the flood gun current is on; this time value is therefore indicated by the legend "Erasure" in Fig. 5. The length of the pulses supplied to control grid 22 to flash on flood beam 36 corresponds closely to the "quiet time" interval e, and the timing of the flood gun grid gating pulse with respect to alternate transmitted pulses f is made such that the said grid gating pulse occurs during the time interval e. By causing the erasure to occur during interval e, a longer time interval is provided for erasure, thus decreasing the required flood gun current, without unduly limiting the minimum range from which echoes can be received, as would be the case if the erasing pulse occurred simultaneously with the transmitted pulse. From a comparison of curves A and B, it may be seen that the storage tube input signal is allowed to trace two successive recordings on the storage surface 8, after which the storage surface charge is erased. The erasure occurs during the quiet time interval e, but may, if desired, be lengthened somewhat to the end of the next succeeding transmitted pulse g.

Curve C represents the gating operation of output amplifier 55. The time intervals during which the amplifier is gated on are substantially equal to those during which the amplifier is gated off, and both of such time intervals are substantially equal to the time interval between successive transmitted impulses such as f and g. The output amplifier gating pulses are so timed with respect to the flood gun control grid gating pulses and the radar beam sweep traces (as may be seen by comparing curves A, B, and C) that the amplifier 55 is gated off during each flood beam erasing pulse and during the recording of the first echo thereafter, and is gated on during the recording of the next echo. Thus, the amplifier is protected, no false indications are produced on scope 57, and the amplifier is gated on only for comparison of the second trace with the first trace.

Curve D represents the storage tube output signal, or the video signal which appears as the output of amplifier 55 and is applied to scope 57. No output signal will be produced while output amplifier 55 is gated off, and, since said amplifier is gated off during alternate echo patterns, the output signal will appear only during the intervening echo patterns. As described in detail above, pips will appear in the output signal only in response to the presence of moving targets within the field of search of the radar equipment. Thus, pip h occurs at the time corresponding to the change in amplitude between the first and second echo traces represented by moving-target pip c, and occurs during alternate echo traces, and pip i occurs at the time corresponding to the change in amplitude between the first and second echo traces represented by moving-target pip d, and also occurs during alternate echo traces. Since the amplifier 55 is gated on during these alternate echo traces, some amplifier noise is represented as occurring on curve D.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. In a pulse-echo radar system including a source of primary spaced repetitive pulses and means for detecting secondary echo pulses occurring between successive primary pulses: an electron discharge device having an electron gun for projecting a beam of electrons and a cooperating electrode having a potential storing surface whose plane is perpendicular to the path of said beam; deflecting means, triggered by said source, for repetitively causing sweeps of said beam in one direction across said surface to occur in synchronism with said primary pulses; deflecting means, connected to said detecting means, for deflecting said beam, in a direction transverse to said one direction, in accordance with said secondary pulses; each resultant path of travel of said beam across said surface producing a line of discrete charges thereon, the potentials of said charges having a predetermined value; means comparing two successive paths of travel of said beam across said surface and for producing, in accordance with any deviations from said predetermined potential value along the second of said two paths of travel, output signals indicative of such deviations; and means, controlled by alternate primary pulses, but delayed with respect thereto until a time immediately prior to the next succeeding primary pulse, for repetitively biasing the entire area of said surface to a common predetermined potential level at which the line of charges is removed from said surface, said predetermined potential level being different from said predetermined potential value.

2. In a pulse-echo radar system including a source of primary spaced repetitive pulses and means for detecting secondary echo pulses occurring between successive primary pulses: an electron discharge device having an electron gun for projecting a beam of electrons and a cooperating electrode having a potential storing surface whose plane is perpendicular to the path of said beam; deflecting means, triggered by said source, for repetitively causing sweeps of said beam in one direction across said surface to occur in synchronism with said primary pulses; deflecting means, connected to said detecting means, for deflecting said beam, in a direction transverse to said one direction, in accordance with said secondary pulses; each resultant path of travel of said beam across said surface producing a line of discrete charges thereon, the potentials of said charges having a predetermined value; means comparing two successive paths of travel of said beam across said surface and for producing, in accordance with any deviations from said predetermined potential value along the second of said two paths of travel, output signals indicative of such deviations; and a second electron gun, and delay gate means connected in the circuit to be triggered on by alternate primary pulses, said gun being disposed and thereby controlled for repetitively flooding substantially the entire area of said surface with electrons at a potential which biases said surface to a predetermined potential level at which said lines of charges are erased.

3. A moving target indicator system comprising a source of primary spaced repetitive pulses and means for detecting secondary echo pulses occurring between successive primary pulses, an electron discharge device including a first electron gun for projecting a relatively narrow main beam of electrons in a prescribed path, a potential storage electrode disposed transversely in the path of said beam, a first beam deflecting means triggered by said source for repetitively scanning a surface of said storage electrode in one direction in synchronism with said primary pulses, a second beam deflecting means connected to said detecting means and responsive to said secondary pulses for scanning said storage electrode in a direction normal to said one direction, a second electron gun adapted to project a relatively wide auxiliary beam of electrons over substantially said entire storage electrode simultaneously, and an output electrode positioned in capacitive relationship with said storage electrode; first gate generating means energized by said primary pulses for deriving a first gate pulse just prior to the occurrence of alternate primary pulses, said second electron gun being responsive to said first gate pulses for returning the entire said surface of said storage electrode to a common potential, second gate generating means triggered by said source for activating said first electron gun during the period when primary and secondary pulses may occur, said storage electrode being raised in potential at points thereon scanned by said main electron beam, an output circuit connected to said output electrode and responsive to differences in potential between the unscanned and previously scanned areas of said storage electrode for deriving a signal, and indicating means energized by said signal for effecting a presentation only of secondary pulses representative of moving targets.

4. A moving target indicator system comprising a source of primary spaced repetitive pulses and means for detecting secondary echo pulses occurring between successive primary pulses, an electron discharge device including a first electron gun for projecting a relatively narrow beam of electrons in a prescribed path, a storage electrode having a planar potential storage surface disposed transversely in the path of said beam, a first beam deflecting means triggered by said source for repetitively causing sweeps of said beam in one direction across said surface to occur in synchronism with said primary pulses, a second beam deflecting means connected to said detecting means and responsive to said secondary pulses for directing said beam on said surface in a direction normal to said one direction, a second electron gun adapted to project a relatively wide beam of electrons for flooding substantially said entire surface simultaneously with electrons, and an apertured output electrode positioned adjacent to and capacitively coupled to said potential storage surface; a step generator energized by said primary pulses from said source for deriving an impulse for every two primary pulses, a delay circuit interposed between said step generator and said second electron gun for producing a first gate pulse just prior to the occurrence of alternate primary pulses, said second electron gun being responsive to said gate pulses for returning the entire surface of said storage electrode to a common potential, gate generating means triggered by said source for activating said first electron gun during the period when secondary pulses may occur, said storage surface being raised in potential at points thereon scanned by said narrow electron beam, an output circuit connected to said output electrode and responsive to differences in potential between the unscanned and previously scanned areas of said storage surface for deriving a signal, and indicating means energized by said signal for effecting a presentation of secondary pulses representative of moving targets.

5. A moving target indicator system as described in claim 4 in which said output circuit further includes means responsive to said step generator for periodically blanking said indicating means.

RUDOLF C. HERGENROTHER.

References Cited in the file of this patent

UNITED STATES PATENTS

| Number | Name | Date |
|---|---|---|
| 2,259,507 | Iams | Oct. 21, 1941 |
| 2,403,562 | Smith | July 9, 1946 |
| 2,422,135 | Sanders | June 10, 1947 |
| 2,437,173 | Rutherford | Mar. 21, 1948 |
| 2,451,005 | Weimer et al. | Oct. 12, 1948 |
| 2,454,652 | Iams | Nov. 23, 1948 |
| 2,491,450 | Holmes | Dec. 13, 1949 |
| 2,512,144 | Emslie | June 20, 1950 |
| 2,532,339 | Schelesinger | Dec. 5, 1950 |
| 2,600,255 | McConnell | June 10, 1952 |